United States Patent [19]
Feldheim

[11] 3,962,800
[45] June 15, 1976

[54] TEACHING DEVICE PARTICULARLY ADAPTED FOR THE GAME OF BLACKJACK

[76] Inventor: Robert J. Feldheim, 1441 Hemlock Ave., East Meadow, N.Y. 11554

[22] Filed: Feb. 20, 1975

[21] Appl. No.: 551,288

[52] U.S. Cl. ............................. 35/8 B; 273/138 A
[51] Int. Cl.² ........................................ G09B 19/22
[58] Field of Search ............ 35/8 B, 31 C; 273/1 E, 273/138 A

[56] References Cited
UNITED STATES PATENTS

| | | | |
|---|---|---|---|
| 3,584,398 | 6/1971 | Meyer et al. | 35/31 C |
| 3,689,071 | 9/1972 | Kucera | 35/8 B X |
| 3,796,433 | 3/1974 | Fraley et al. | 273/138 A |
| 3,854,226 | 12/1974 | Divine et al. | 35/31 C |
| 3,924,340 | 12/1975 | Tammone | 35/8 B |

*Primary Examiner*—William H. Grieb
*Attorney, Agent, or Firm*—Arthur L. Plevy

[57] ABSTRACT

There is described a teaching device for use in learning the game of Blackjack. The unit has logic circuitry therein which is implemented according to certain logical formats enabling a user to play the game correctly based upon understanding the odds and chances he is subjected to during actual play.

A memory stores a plurality of hands which are randomly selected and which based upon the user's hand, as displayed, determine a preferred course of action. If the user makes a decision contrary to a most desired approach, the device will indicate this condition. Similarly, if the user's decision is correct, this will also be displayed or verified by the device.

10 Claims, 7 Drawing Figures

TEACHING DEVICE PARTICULARLY ADAPTED FOR THE GAME OF BLACKJACK

BACKGROUND OF THE INVENTION

This invention relates to teaching machines, in general, and mmore particularly to such a device for teaching a user the correct play in the game of blackjack.

While there exists a number of patents and literature involving teaching machines, a cursory review of the art will show that most units are directed toward a particular object and, in general, are not adaptable to teach other games or techniques.

It is therefore an object of this invention to provide a teaching machine particularly adapted for use with the game of blackjack or sometimes referred to as the game of "Twenty-One".

THEORY OF THE CONCEPTS INVOLVED IN THE GAME OF BLACKJACK AS DETERMINING THE APPARATUS.

Before proceeding with a detailed description of the drawings, a philosophy of play will be afforded to enable one to understand the implementation of the logic and apparatus to be described.

Blackjack or twenty-one is a card game, whereby a group of players play gainst a dealer. The objective of all participants is to possess a final hand whose sum of face value cards is as close to or equal to the sum of twenty-one without exceeding that number. A hand which exceeds twenty-one is sometimes referred to as a "bust" and is an automatic losing hand. The hand that is closer to twenty-one as between the participant and the dealer, is a winning hand. Ties or hands adding up to the same value are "stand-offs" and hence, there is no winner or loser.

The game is played with one or more decks of cards. After a shuffle, each player bets a desired amount and the dealer proceeds to deal the cards. Each player then receives a first card face down, and the dealer receives his first card opened or face up.

The next deal involves each player receiving a second card, also closed or face down and the dealer now receives his second card closed or face down.

Hence, each player at the end of the first and second deal has two cards face down; while the dealer has one card face down and one card face up.

The cards in a normal deck are weighted as follows for the game of blackjack. Aces count as one or eleven, determined only by the desire of the player; who selects and stays with that value. Jacks, Queens, Kings count as ten. The remaining cards as 2,3,4,5,6, 7,8,9 and 10 count as per their face value. Thus a Deuce counts as two and a Ten counts as a ten.

An ace and a Ten or a picture is, in fact, twenty-one and is called a natural, since these are the only two card combination which equal twenty-one.

The game therefore requires that when the dealer's open card is an Ace or a ten-value, he looks at his closed card. If he has a Natural, he wins immediately and collects all bets from the players, except from those players who also have a Natural. This is, of course, a tie- or stand-off and these players retain the money bet and a new hand is dealt as indicated above.

Statistics verify that a dealer will have a Natural about 4.8 percent of the time, or fewer than once in twenty deals. Thus, the teaching machine must recognize the fact that there is nothing a player can be taught when the dealer has a Natural. But 95.2 percent of the time or approximately nineteen out of twenty hands, the dealer will not have a Natural and the player, based upon his card values and the opened card of the dealer, must make a logical judgment as to his course of action. The player can then do one of four things:

1. DRAW - The player asks for another card, which is dealt face-up. If the total of his three cards exceed twenty-one, he has a bust, and loses and must say so by showing all his cards. If he has less than twenty-one, he once again has a decision to make, except this time he can either draw another card or stand and keep the cards and therefore the amount (less than twenty-one) he has. He can, of course, draw additional cards as long as he does not exceed a hand of twenty-one.

2. STAND - The player determines that the odds are against him if he requests another card and therefore stays with the original hand as dealt.

3. DOUBLE OR DOUBLES DOWN - The player turns over or opens his closed card, doubles his bet and draws one and only one additional card.

4. SPLIT - If the player's closed cards are a matched pair, as two Jacks, two Queens, two Sevens and so on, he has the option of playing them each as a separate hand; face up and side by side. He must double his bet when he selects this course of action. Each hand is then played consecutively and separately. The player then receives an additional open card to his first hand and plays this hand until he wishes to stand or twenty-one is exceeded. He then proceeds to play his second hand. Thus, when he splits and has two cards in one hand, he again must make a decision.

Thus, the smart or seasoned player decides his course of action based upon his first two cards as compared with the open card of the dealer. He does this to increase his odds of success. The odds have been predetermined in the past and it is common knowledge that there are right and wrong ways to decide based on such considerations.

The purpose of this apparatus is to exercise or teach a player or participant the correct or right way to select and hence, to avail himself of the best odds.

A most important factor in playing Blackjack is that a dealer must draw a card on all hands he has totalling up to sixteen and must stand on all hands totalling seventeen or more. The dealer cannot Double or Split.

The dealer also plays his hand last and after all players have played their hands. Hence, it should be apparent that the dealer wins on every bust or wins every time a player draws a hand exceeding a sum of twenty-one, even though he has not yet played his hand.

As is known, a conventional deck of cards contains thirteen cards of Ace through King in four suits and as such can provide 1326 different two card hands. But in blackjack, there is no distinction based on suits; as clubs, spades, hearts and diamonds do not count. Hence, in a Blackjack hand, there are only sixteen Tens, (including all Tens, Jacks, Queens, and Kings) and four of each of Aces through Nines. Furthermore, if one realizes that an Ace - Three combination, is the same as a Three - Ace combination, then there are actually only fifty-five (55) possible hands a player may hold. This fact can easily be verified by by a table of all combinations of Aces, Tens, etc.

The following table is presented to show that the 55 blackjack hands can be rearranged and combined, based on the fact that a hard-value hand is the same no matter how it is composed and hence, the 55 blackjack hands can be reduced to 34.

A hard-value hand is a hand which does not contain an Ace or a pair. A soft value hand is a hand that contains one Ace.

no matter what the value of the dealer's open card may be. The table below indicates these.

TABLE I

The 34 Real Hands a Player may Hold.

| Category | | | | | | | | | |
|---|---|---|---|---|---|---|---|---|---|
| Natural "Soft" Values containing an Ace (less than 21) | 1. | A-10 | | | | | | | |
| | 2. | A-9 | | | | | | | |
| | 3. | A-8 | | | | | | | |
| | 4. | A-7 | | | | | | | |
| | 5. | A-6 | | | | | | | |
| | 6. | A-5 | | | | | | | |
| | 7. | A-4 | | | | | | | |
| | 8. | A-3 | | | | | | | |
| | 9. | A-2 | | | | | | | |
| Pairs | 10. | A-A | | | | | | | |
| | 11. | 10-10 | | | | | | | |
| | 12. | 9-9 | | | | | | | |
| | 13. | 8-8 | | | | | | | |
| | 14. | 7-7 | | | | | | | |
| | 15. | 6-6 | | | | | | | |
| | 16. | 5-5 | | | | | | | |
| | 17. | 4-4 | | | | | | | |
| | 18. | 3-3 | | | | | | | |
| | 19. | 2-2 | | | | | | | |
| "Hard" Values (Less than 21 with no Ace or Pair) | 20. | 19 | 10-9 | | | | | | |
| | 21. | 18 | 10-8 | | | | | | |
| | 22. | 17 | 10-7 | 9-8 | | | | | |
| | 23. | 16 | 10-6 | 9-7 | | | | | |
| | 24. | 15 | 10-5 | 9-6 | 8-7 | | | | |
| | 25. | 14 | 10-4 | 9-5 | 8-6 | | | | |
| | 26. | 13 | 10-3 | 9-4 | 8-5 | 7-6 | | | |
| | 27. | 12 | 10-2 | 9-3 | 8-4 | 7-5 | | | |
| | 28. | 11 | | 9-2 | 8-3 | 7-4 | 6-5 | | |
| | 29. | 10 | | | 8-2 | 7-3 | 6-4 | | |
| | 30. | 9 | | | | 7-2 | 6-3 | 5-4 | |
| | 31. | 8 | | | | | 6-2 | 5-3 | |
| | 32. | 7 | | | | | | 5-2 | 4-3 |
| | 33. | 6 | | | | | | | 4-2 |
| | 34. | 5 | | | | | | | 3-2 |

TABLE II

| PLAYER'S HAND | | ALWAYS HANDS DESCRIPTION | PLAYER ACTION |
|---|---|---|---|
| (Numbers refer to the number hand in Table I) | | | |
| 1. | A-10 | Natural | The player opens his closed card. If the dealer also has a Natural, it is a stand-off, otherwise the player wins. |
| 31. | 6-2 or 5-3 | Hard "8" or less | Draws |
| 32. | 5-2 or 4-3 | | |
| 33. | 4-2 | | |
| 34. | 3-2 | | |
| 2. | A-9 | 19 and 20; "Hard values of 17 or more | Always Stand |
| 3. | A-8 | | |
| 11. | 10-10 | | |
| 20. | 10-9 | | |
| 21. | 10-8 | | |
| 22. | 10-7 or 9-8 | | |
| 28. | 9-2 or 8-3 or 7-4 or 6-5 | Hard Eleven | Always Double Down |
| 10. | A-A | Pair of Aces | Always Splits |
| 13. | 8-8 | Pair of Eights | |

Of the 34 hands that the player may hold, there are 14 Always hands that require a certain specific action Table III contains only those 20 combinations* of hands that require the player to compare his values to the dealer's open card before determining his course of action. (The 14 Always Hands are eliminated).

TABLE III

| | | Player compares value to Dealer's Open Card. | | | | | | | | |
|---|---|---|---|---|---|---|---|---|---|---|
| | PLAYER'S HAND | DEALER'S OPEN CARD | | | | | | | | |
| | | 2 | 3 | 4 | 5 | 6 | 7 | 8 | 9 | 10 | A |
| Soft Values (6 in all) | A-7 | Stand | Double | Double | Double | Double | Stand | Stand | Draw | Draw | Stand |
| | A-6 | Double | Double | Double | Double | Double | Draw | Draw | Draw | Draw | Draw |
| | A-5 | Draw | Draw | Double | Double | Double | Draw | Draw | Draw | Draw | Draw |
| | A-4 | Draw | Draw | Double | Double | Double | Draw | Draw | Draw | Draw | Draw |

TABLE III-continued

Player compares value to Dealer's Open Card.

| | PLAYER'S HAND | 2 | 3 | 4 | 5 | 6 | 7 | 8 | 9 | 10 | A |
|---|---|---|---|---|---|---|---|---|---|---|---|
| | A-3 | Draw | Draw | Double | Double | Double | Draw | Draw | Draw | Draw | Draw |
| | A-2 | Draw | Draw | Double | Double | Double | Draw | Draw | Draw | Draw | Draw |
| Pairs (6 in all) | 9-9 | Split | Split | Split | Split | Split | Stand | Split | Split | Stand | Stand |
| | 7-7 | Split | Split | Split | Split | Split | Split | Split | Draw | Draw | Draw |
| | 6-6 | Split | Split | Split | Split | Split | Draw | Draw | Draw | Draw | Draw |
| | 4-4 | Draw | Draw | Draw | Split | Draw | Draw | Draw | Draw | Draw | Draw |
| | 3-3 | Split | Split | Split | Split | Split | Draw | Draw | Draw | Draw | Draw |
| | 2-2 | Split | Split | Split | Split | Split | Draw | Draw | Draw | Draw | Draw |
| Hard Values (7 in all) | 16 | Stand | Stand | Stand | Stand | Stand | Draw | Draw | Draw | Draw | Draw |
| | 15 | Stand | Stand | Stand | Stand | Stand | Draw | Draw | Draw | Draw | Draw |
| | 14 | Stand | Stand | Stand | Stand | Stand | Draw | Draw | Draw | Draw | Draw |
| | 13 | Stand | Stand | Stand | Stand | Stand | Draw | Draw | Draw | Draw | Draw |
| | 12 | Draw | Draw | Stand | Stand | Stand | Draw | Draw | Draw | Draw | Draw |
| (5-5) or | 10 | Double | Double | Double | Double | Double | Double | Double | Draw | Draw | Draw |
| | 9 | Double | Double | Double | Double | Double | Draw | Draw | Draw | Draw | Draw |

Always play a 5-5 pair as a Hard Ten.

Tables IV through VII are the logical Sub-Divisions of Table III, for memorization or study by the Exercising player using the apparatus to be described.

TABLE IV

| | (DRAW) | | | | X = draw by a player | | | | | |
|---|---|---|---|---|---|---|---|---|---|---|
| Player's Hand | 2 | 3 | 4 | 5 | Dealer's Open Card 6 | 7 | 8 | 9 | 10 | A |
| A-7 | | | | | | | | X | X | X |
| A-6 | | | | | | X | X | X | X | X |
| A-5 | X | X | | | | X | X | X | X | X |
| A-4 | X | X | | | | X | X | X | X | X |
| A-3 | X | X | | | | X | X | X | X | X |
| A-2 | X | X | | | | X | X | X | X | X |
| 9-9 | | | | | | | | | | |
| 7-7 | | | | | | | X | X | X | X |
| 6-6 | | | | | .X | X | X | X | | |
| 4-4 | X | X | X | X* | X | X | X | X | X | |
| 3-3 | | | | | X | X | X | X | X | |
| 2-2 | | | | | X | X | X | X | X | |
| 16 | | | | | X | X | X | X | X | |
| 15 | | | | | X | X | X | X | X | |
| 14 | | | | | X | X | X | X | X | |
| 13 | | | | | X | X | X | X | X | |
| 12 | X | X | | | X | X | X | X | X | |
| 10 (5-5) | | | | | | | X | X | X | |
| 9 | | | | | X | X | X | X | X | |

RULES

1. Never Draw with a 9—9.
2. Never Draw with any hard hand of 9 or more if the dealer shows a 6 or less - except when you hold a hard 12 and the dealer shows a 2 or 3.
3. With any hand except hard 8 or less, never Draw when the dealer shows a 5.
4. Always Draw when the dealer shows a 9 or 10, except for 9—9 and the Always hands. (See TABLE II).

TABLE V DRAW -- SIMPLIFIED

From the above Table it is noted that there is no occasion when the players draw is predicated upon the dealer showing a 5. Also, since there is no occasion when 9—9 Draws, it is not included in the player's hand column. (18 hands in all)

| Player's Hand "Soft" | "Pairs" | "Hard" | Dealer's Open Card All Except 5 | All Except 4,5, or 6 | X = Draw by Player | | | |
|---|---|---|---|---|---|---|---|---|
| | | | | | 7 thru A | 8 thru A | 9 or 10 | 9,10 or A |
| | 4-4 | | X | | | | | |
| A-5 | | 12 | | X | | | | |
| A-4 | | | | | | | | |
| A-3 | | | | | | | | |
| A-2 | | | | | | | | |
| A-6 | 3-3 | 16 | | | | X | | |
| | 2-2 | 15 | | | | | | |
| | | 14 | | | | | | |
| | | 13 | | | | | | |
| | | 9 | | | | | | |
| | 6-6 | 10 | | | | X | | |
| A-7 | | | | | | | X | |
| | 7-7 | | | | | | | X |
| | 5-5 | | | | | | | |

TABLE IV

"STAND" — Player X = Stands

| Players Hand | 2 | 3 | 4 | 5 | 6 | 7 | 8 | 9 | 10 | A |
|---|---|---|---|---|---|---|---|---|---|---|
| A-7 | X | | | | | X | X | | | X |
| A-6 | | | | | | | | | | |
| A-5 | | | | | | | | | | |
| A-4 | | | | | | | | | | |
| A-3 | | | | | | | | | | |
| A-2 | | | | | | | | | | |
| 9-9 | | | | | | | | X | X | X |
| 7-7 | | | | | | | | | | |
| 6-6 | | | | | | | | | | |
| 4-4 | | | | | | | | | | |
| 3-3 | | | | | | | | | | |

TABLE IV-continued

"STAND"  Player X = Stands

| Players Hand | 2 | 3 | 4 | 5 | 6 | 7 | 8 | 9 | 10 | A |
|---|---|---|---|---|---|---|---|---|---|---|
| 2-2 | | | | | | | | | | |
| 16 | X | X | X | X | X | | | | | |
| 15 | X | X | X | X | X | | | | | |
| 14 | X | X | X | X | X | | | | | |
| 13 | X | X | X | X | X | | | | | |
| 12 | | | X | X | X | | | | | |
| 10 | | | | | | | | | | |
| 9 | | | | | | | | | | |

DEALER'S OPEN CARD

TABLE VII

"STAND" SIMPLIFIED  Player X = Stands

DEALER'S OPEN CARD

| PLAYER'S HAND "soft" | "Pairs" | "Hard" | 2,7,8 or A | 7,10, or A | 2 thru 6 | 4,5, or 6 |
|---|---|---|---|---|---|---|
| A-7 | | | X | | | |
| | 9-9 | | | X | | |
| | | 16 | | | X | |
| | | 15 | | | X | |
| | | 14 | | | X | |
| | | 13 | | | X | |
| | | 12 | | | | X |

RULES

1. Never Stand with soft values of 17 or less.
2. Never Stand with any pair except 9—9 and then only when the dealer shows 7,10 or A, (Except A—A, 10—10 or 8—8 Always hands)
3. Never Stand with nard values of 11 or less.
4. Never Stand with any hard hand of 16 or less if dealer shows a 7 or more.

TABLE VIII

DEALERS OPEN CARD / DOUBLES DOWN  Player X=Doubles Down

| PLAYERS HAND | 2 | 3 | 4 | 5 | 6 | 7 | 8 | 9 | 10 | A |
|---|---|---|---|---|---|---|---|---|---|---|
| A-7 | | X | X | X | X | | | | | |
| A-6 | X | X | X | X | X | | | | | |
| A-5 | | | X | X | X | | | | | |
| A-4 | | | X | X | X | | | | | |
| A-3 | | | X | X | X | | | | | |
| A-2 | | | X | X | X | | | | | |
| 9-9 | | | | | | | | | | |
| 9-7 | | | | | | | | | | |
| 6-6 | | | | | | | | | | |
| 4-4 | | | | | | | | | | |
| 3-3 | | | | | | | | | | |
| 2-2 | | | | | | | | | | |
| 16 | | | | | | | | | | |
| 15 | | | | | | | | | | |
| 14 | | | | | | | | | | |
| 13 | | | | | | | | | | |
| 12 | | | | | | | | | | |
| 10 (5-5) | X | X | X | X | X | X | X | | | |

TABLE VIII-continued

| PLAYERS HAND | 2 | 3 | 4 | 5 | 6 | 7 | 8 | 9 | 10 | A |
|---|---|---|---|---|---|---|---|---|---|---|
| 9 | | X | X | X | X | | | | | |

Rules

1. With the exception of the alwyas hand 11; never double when the dealer shows a 7 or higher, (except when player holds two hard 10 and the dealer shows a 7 or 8.)
2. Never Double with hard values of 12 or more.
3. Never Double a pair (except 5—5).

TABLE IX DOUBLE DOWN SIMPLIFIED

Since there is no occasion when the player will be motivated to Double because the dealer's open card is a 9, 10 or Ace, these three cards are not shown in this table.

DEALER'S OPEN CARD (X=Player Double Down)

| PLAYER'S HAND "Soft" | "Pairs" | "Hard" | 2 thru 6 | 2 thru 8 | 3 thru 6 | 4 thru 6 |
|---|---|---|---|---|---|---|
| A-6 | | 9 | X | | | |
| | (5-5) or 10 | | | X | | |
| A-7 | | | | | X | |
| A-5 | | | | | | X |
| A-4 | | | | | | |
| A-3 | | | | | | |
| A-2 | | | | | | |

TABLE X

SPLIT  Player X=splits

DEALER'S OPEN CARD

| Players Hand | 2 | 3 | 4 | 5 | 6 | 7 | 8 | 9 | 10 | A |
|---|---|---|---|---|---|---|---|---|---|---|
| 9-9 | X | X | X | X | X | | X | X | | |
| 7-7 | X | X | X | X | X | X | X | | | |
| 6-6 | X | X | X | X | X | | | | | |
| 4-4 | | | | X | | | | | | |
| 3-3 | X | X | X | X | X | | | | | |
| 2-2 | X | X | X | X | | | | | | |

(31 situations)

TABLE XI

SPLIT SIMPLIFIED
The ten and Ace do not appear in the dealer's
exposed card portion because player never splits
(except for A-A and 8-8 which Always split)
when dealer shows a ten or Ace.

| Players Hand | DEALER'S OPEN CARD All except 7 | All except 9 | 2 thru 7 | 2 thru 6 | 5 |
|---|---|---|---|---|---|
| 9-9 | X | | | | |
| 7-7 | | X | | | |
| 6-6 | | | X | | |
| 3-3 | | | | X | |
| 4-4 | | | | | X |

(X = Player Splits)

Upon a perusal of the above tables, it can be seen that there are a number of unique situations, which determine the course of a a player and hence the apparatus to be described operates in conjuction with such tables to give a user an automatic indication of whether his choice is proper and by supplying a user with the above noted tables or rules, he may use the apparatus to practice and therefore improve his game.

BRIEF DESCRIPTION OF PREFERRED EMBODIMENT

A teaching apparatus for learning the game of Blackjack, comprising a memory having a plurality of addresses for storing at each address one of a plurality of blackjack hands, including at least two player cards and one dealer card, said address further including indicia stored therein determinative of a proper player response; means for displaying said Blackjack hand as stored; selection means for selecting any one of a given number of player responses and logic means responsive to said one selected respone and said indicia to provide an indication of a correct player decision.

DETAILED DESCRIPTION OF FIGURES

Figure 1:
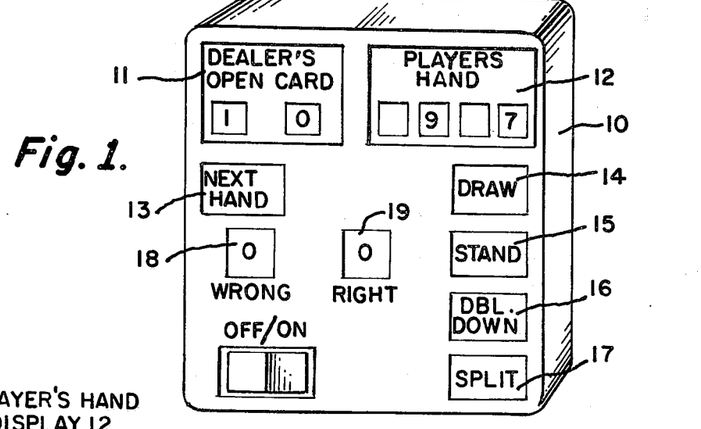
FIG. 1 is a perspective plan view of a housing of a teaching machine according to this invention.

Referring to FIG. 1 there is shown a perspective view of a housing 10 for the teaching apparatus to be described. It is understood that there are numerous formats for such a housing as 10 and various displays, panels and enclosures can be implemented. Essentially, the housing 10 is rectangular and has the appearance of a calculator or small transistor radio.

The housing includes windows or viewing areas as 11 and 12 for displaying by means of light emitting diodes, liquid crystals or some other visual display, a dealer's open card value as an Ace through Ten and a player's two card value. It is understood that an Ace can be displayed as an A. or as a 1.

There are also five pushbuttons 13 to 17, and designated as NEXT HAND 13, DRAW 14, STAND 15, DBL DOWN (DOUBLE DOWN) 16 and SPLIT 17. The buttons 14 to 17 are used by a player to make his selection according to the above tables and based upon the value shown for the dealer's hand in display window 11.

The NEXT HAND or deal button 13 erases the display and presents a new set of cards or values for display at areas 11 and 12.

There are two indicator lamp assemblies 18 and 19 designated as WRONG 18 and RIGHT 19, which may be a red lamp or display for 18 and a green lamp or display for 19.

The lamps 18 and 19, as will be explained, inform the player as to whether his course of action or decision was the correct one or whether it was the incorrect one. This indication is automatically provided after the player has depressed one of the play buttons 14 to 17.

Therefore the display indicated in FIG. 1 informs the player that the dealer has an open value card of ten (a Ten, Jack, Queen or King), and that the player has two cards, one of which is a Nine and the other a Seven, for a total of sixteen.

It will be also apparent that one could display as easily, Jacks as a J; Queens as a Q; Kings as a K, if desired, and in order to more clearly follow the indicia associated with normal playing card decks. However, it should be clear from the above description, that the rules do not really require this type of display.

Figure 2:
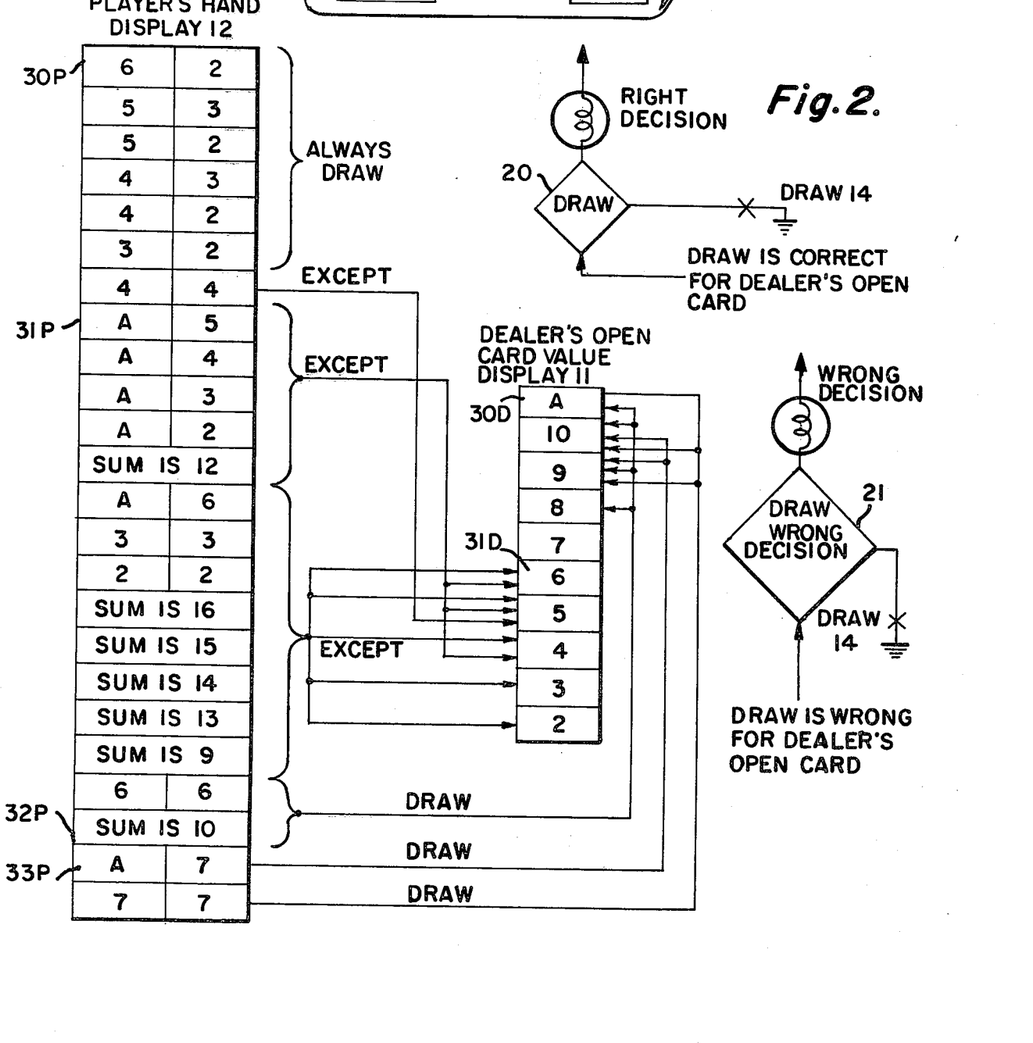
FIG. 2 is a flow chart indicating proper decisions for a Draw condition according to the logic employed.

Referring to FIG. 2, there is shown a flow chart which implements the decisions indicated in Tables II and V. The flow chart combines the DRAW portion of Table II with the DRAW portion of Table V.

A logic decision module 20 is indicated as a Draw. An input to module 20 is obtained from a memory which furnishes the display as stored and hence the correct move in regard to a DRAW decision is ascertained. The player's hand display 12 is tabulated and shown, as is the dealer's hand display 11. These cards or display shown would be those stored in memory. A DRAW WRONG DECISION module 21 is also shown and has an input from the memory which stores the display of both the player 12 and dealer 11. Hence, the lead designated DRAW IS WRONG will be activated on module 21 as soon as the display is presented. Similarly the lead DRAW IS CORRECT on module 20 will also be activated if a DRAW is a correct decision. The PLAYER, when viewing the display, then depresses any one of the four buttons 14 to 17 of FIG. 1. If the draw button is depressed, the right indicator will light if the decision is valid based on the display data, if not, the wrong indicator will light provided the player depresses the DRAW.

For example, numeral 30P specifies a player's hand consisting of a Six and a Two. Numeral 30D specifies that the dealer's open card is an Ace. The logic shows that a player with a hand of a 6 and 2 must always Draw, no matter what the dealer has. Hence, if the player depressed the Draw button, he would be correct and it would be so indicated. The depression of any other button would be wrong and this would be so indicated.

Now assume the player hand 31P is an Ace and a Five and the dealer's hand 31D is a Six.

The diagram states that a Draw is a correct decision for all dealer's hands except for a Four, Five or Six. Hence, if the player selects a draw, he is wrong. The selection of another button may be correct or not as will be further explained.

There is also indicated in the Player's hand display 12, a number of conditions which state that the sum is a number. For example, 32P references a player's hand wherein the sum of the display is 10. This of course, means a Six and a Four or some other total of card face values equaling 10 (ten). It is seen that for this condition, a player should Draw if the dealer's hand 11 is an ACE, Ten, Nine or Eight. If the dealer's hand 11 shows any other value than a DRAW on the activation of button or switch 14 is a WRONG decision.

For convenience and clarity, the FIG. 2 shows certain conditions which are as except, which means that for those players hands, as for example, the combination of 4 and 4, the player should not draw if the dealer shows a Five and should draw on all other dealer displays. Alternatively, the player's hand of an ACE, 7 (33P) shows that the player should Draw if the dealer shows a Nine or a Ten.

Figure 3:
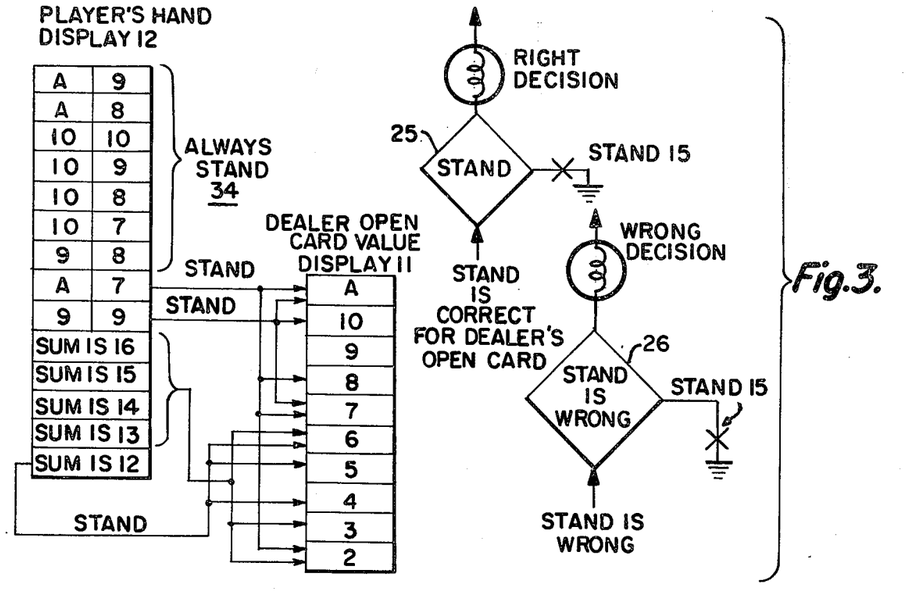
FIG. 3 is a flow chart showing the proper conditions for a Stand position.

FIG. 3 shows a logic flow diagram combining the results of TABLE II with TABLE VII and indicative of the correct STAND decisions for the player.

The player's hands are again shown in display form as is the dealer's hand or open card.

A module 25 determines a correct condition when a player correctly depresses the STAND button 15, and a module 26 determines a WRONG decision when the stand button 14 is incorrectly selected.

Thus for player's hands enclosed within bracket 34, the decision is always STAND and hence if for this player display 12, the stand button 14, when selected, is a correct decision.

Similarly, for a hand of a player of an Ace and Seven, the player should select the STAND button 15 when the dealer display 11 shows an Ace, Eight, Seven or Two.

Figure 4:
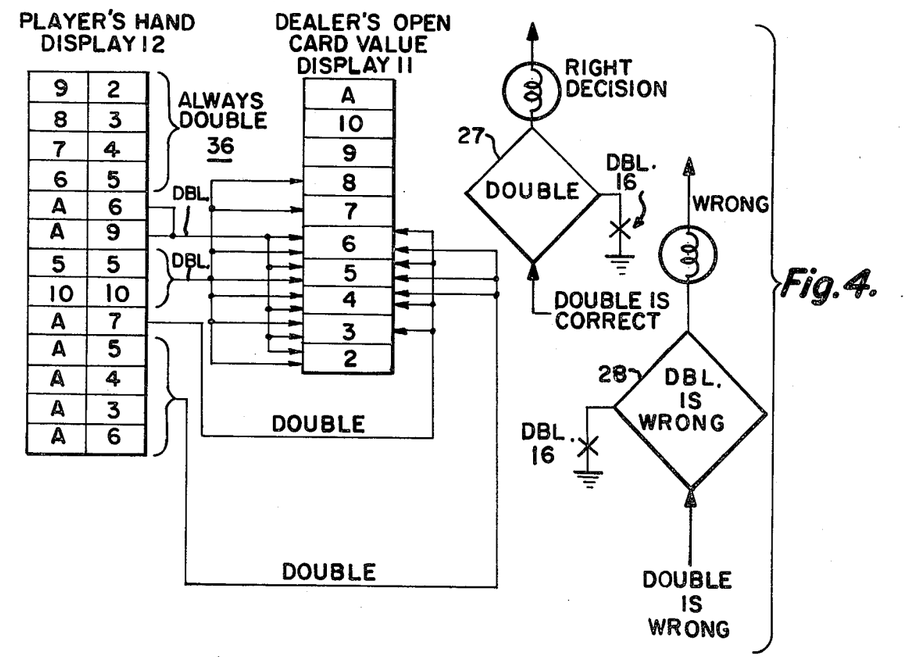
FIG. 4 is a flow chart showing proper conditions for a Double condition and is useful in understanding the logic employed.

Referring to FIG. 4 there is shown a flow chart combining the logical decisions of Table II with Table IX and indicative of the player's decisions in regard to depression of the Double Down or Double button 16.

Hence, as seen from the FIG. 4, a player should always Double for any hand encompassed within bracket 36, and then Double only according to the tabulated results. The modules 27 and 28 respectively, indicate the RIGHT decision and the WRONG decision based on the logical formats indicated.

Figure 5:
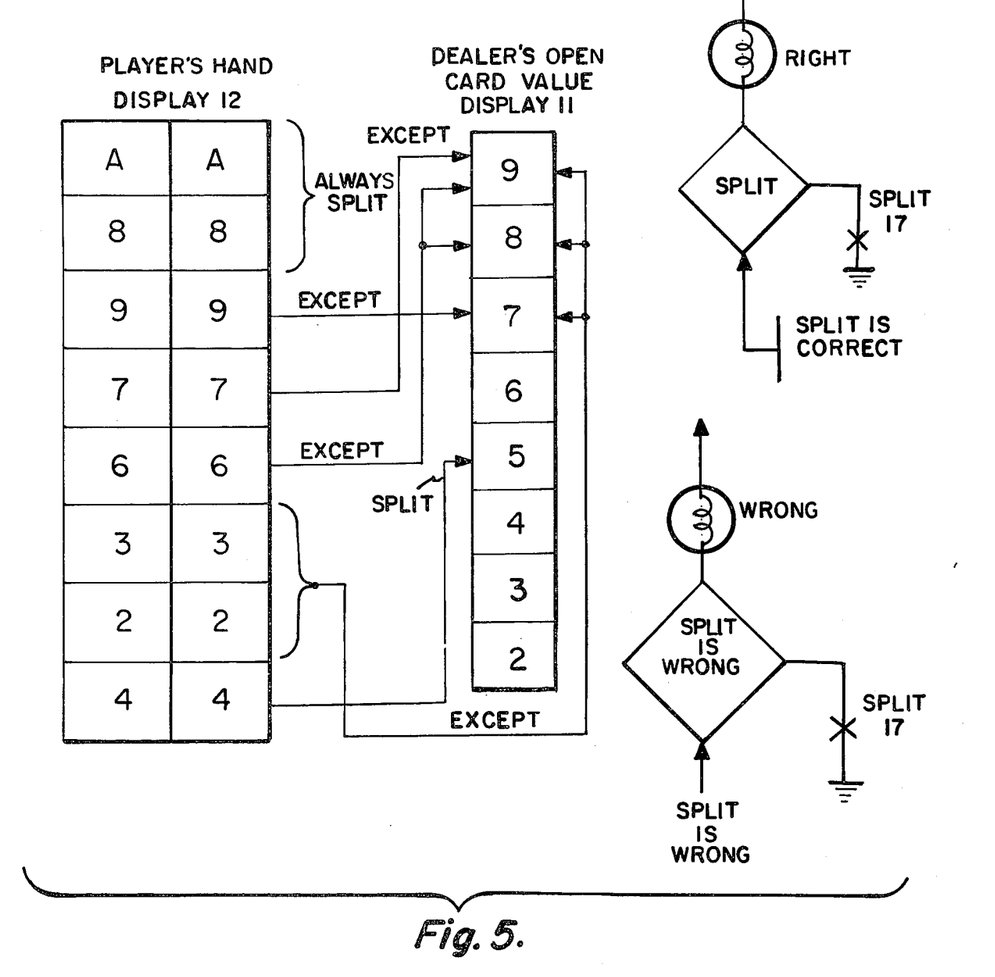
FIG. 5 is a flow chart useful in understanding the logic employed for a Split condition.

FIG. 5 is a flow chart derived from Table II and Table XI and is indicative of the correct decisions by the player in regard to the activation or selection of the Split button 17.

In any event, some improper decisions are shown in the diagram of FIG. 5. For example, a player should always Split a pair of Aces or a pair of Eights, no matter what the dealer shows.

He should also always Split a pair of Nines except when the dealer shows a Seven. Similarly, as can be ascertained from FIG. 5, he should always Split a pair of Sevens except when the dealer shows a Nine.

Having provided a detailed description of the logic and theory, reference will be made to FIG. 6 for an explanation of the logic circuitry and the apparatus to be used in conjunction with a housing as shown in FIG. 1.

Figure 6:
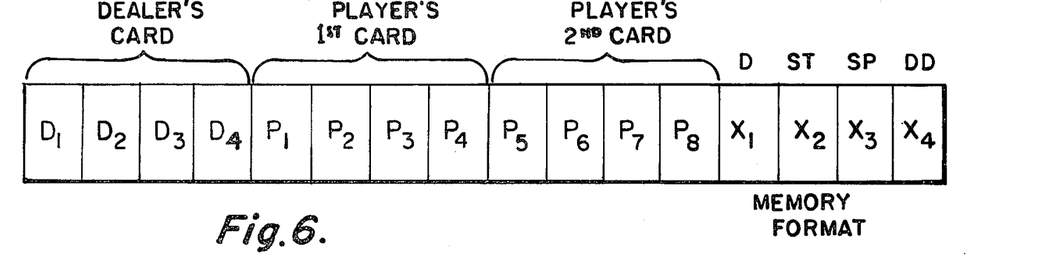
FIG. 6 is a schematic diagram of one particular memory format which can be utilized in practicing this invention.

For the sake of convenience and in regard to conventional logic circuitry, FIG. 6 shows a memory format to be used in the invention. The format to be depicted will be shown in binary form (base 2) but it is apparent that any other desired base or format can be used and implemented as well.

Since it is known that the dealer or a player can only have ten different cards, each card is represented by four binary bits and can be as follows:

| CARD | BINARY NUMBER |
|---|---|
| A | 0000 |
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |

There are also four bits in memory shown as $X_1, X_2, X_3$ and $X_4$ which stand for a DRAW (D), STAND (ST), SPLIT (SP) or DOUBLE DOWN (DD).

One of these bits will be at a high value depending upon the hand stored in memory.

EXAMPLE I

Referring to FIG. 2, assume a memory location is indicative of the following hand.

The player's hand is to be displayed as a Ace and a Five (31P of FIG. 2) and the dealer's hand is to be displayed as a Seven.

Therefore the bits $D_1, D_2, D_3$ and $D_4$ as stored in memory for the dealer's card are 0111, the player's first or second card may be either an Ace or five as above indicated; since the order is not important.

Assume the player's first card is an Ace, therefore bits $P_1$, $P_2, P_3$ and $P_4$ will be 0000 and bits $P_5, P_6$, $P_7$ and $P_8$ would be 0101. Thus a memory location would contain the data indicated for a hand of a dealer of Seven and a player hand of Ace and Five.

Now from the logic flow chart of FIG. 2, it is known that a correct decision based on the player's hand and the dealer's open card would be to DRAW, therefore the DRAW BIT $X_1$ would be at binary one and the rest of the bits $X_2, X_3, X_4$ at zero. Thus, for this hand, the format stored at a memory location is:

0111 0000 0101 1000

This sixteen bit format is indicative of all hands and all decisons. As noted, while a binary format is shown using separate bits for Draw, Split, Stand and Double, other simpler codes could be employed as well.

EXAMPLE II

Referring to FIG. 3, assume a player's hand is to be an Ace and a Seven and the dealer's hand is an Ace. It is seen that this is a STAND DECISION and hence, another memory location would contain the the following format:

0000 0000 0111 0100; representing a dealer Ace, a player Ace, a player Seven and a binary one in the Stand position.

Thus, it can be seen that any hand and any decision can be prestored in a memory as a sixteen bit binary number.

Figure 7:
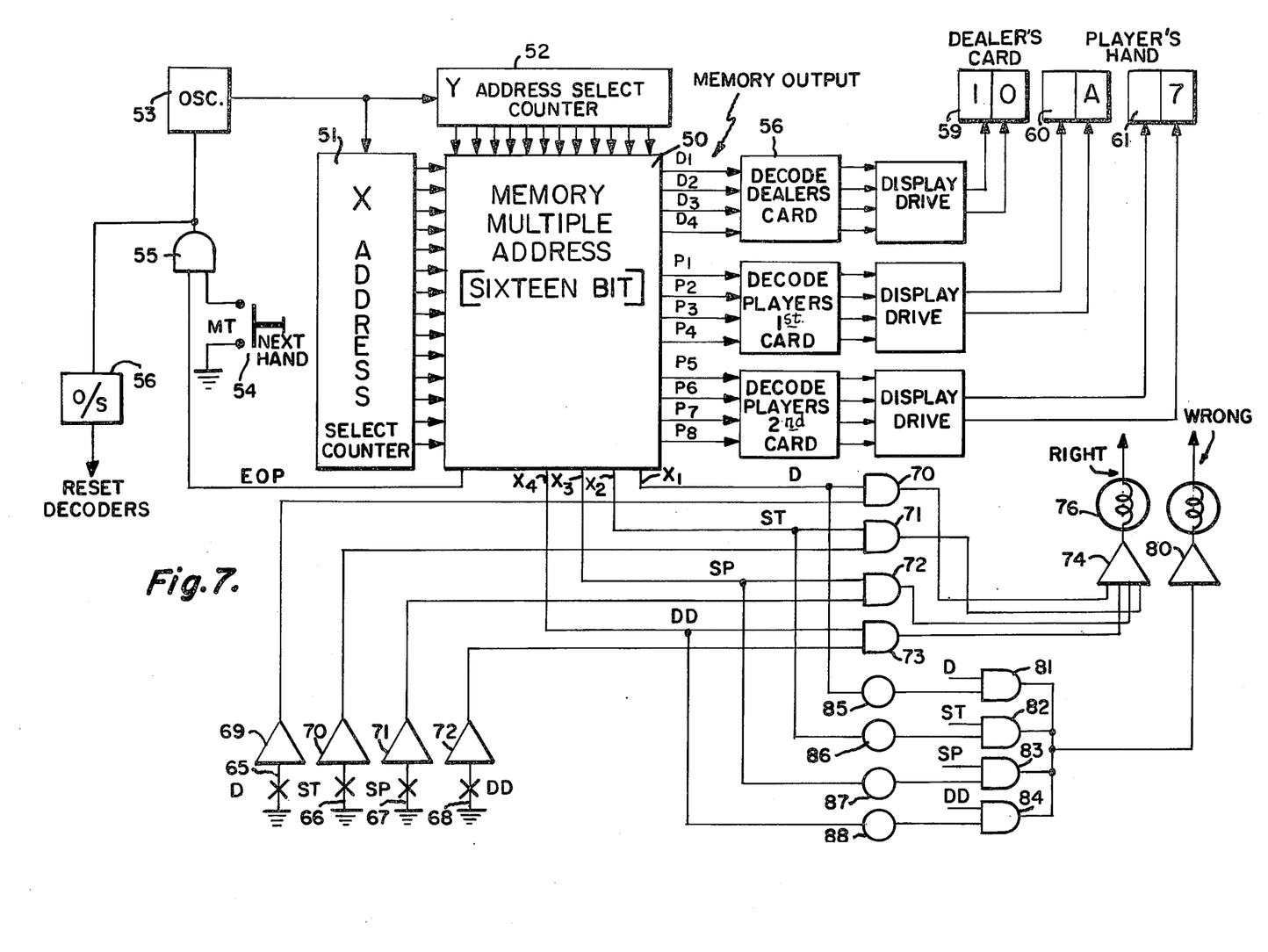
FIG. 7 is a schematic diagram partially in block form of one embodiment of a teaching machine apparatus operating according to a set of desired logic conditions.

Referring to FIG. 7, there is shown a circuit diagram partially in block form of a teaching apparatus operating according to above described principles.

A sixteen bit address ROM, (read only memory) 50 contains any number of hands desired. Such memories exist and use commercially available integrated circuit chips and have large capacities as containing over four thousand locations for storage. In any event, thousands of sixteen bit locations can be provided and are sufficient to store therein each and every possible hand, including, if desired, hands which will decode as ordinary cards showing Kings, Queens and Jacks and so on.

Each sixteen bit memory location is addressed conventionally by an X and a Y address code. These codes are generated by the X address SELECT 51 and the Y address SELECT 52. Such modules as 51 and 52 are ordinary binary counters or shift registers and are usually included on the same chip as the memory 50. A read only memory (ROM) is a non-alterable of fixed program memory and has the information placed therein during the manufacturing process. They can be fabricated from MOS processes and information is placed therein by suitable gate-oxide masks. See a text entitled ELECTRONIC INTEGRATED SYSTEMS DESIGN by Camenzid and published by Van Nostrand-Reinhold (1972), pages 214 and 215, for examples of such memories as 50.

The X and Y SELECT registers 51 and 52 are driven by a high frequency oscillator 53, which is controlled to step the X and Y counters or registers 51 and 52 randomly under control of the NEXT HAND switch 54 (as switch 13 of FIG. 1). Hence, the oscillator 53 operates only when the momentary switch 54 is depressed. The switch 54 is a momentary switch and will open when pressure is removed. The switch 54 activates the oscillator 53 via an AND gate 55. Another input to AND gate 55 if from the memory 50 and designated as EOP or end of program. Such memories, once accessed will produce a signal upon selection of an address or completion of an operation. This signal therefore assures that the memory has stopped operation and therefore the NEXT HAND switch 54 can be activated at the desired time.

Since one cannot control the closure of the switch 54, the oscillator 53, when activated provides a large number of pulses which randomly step the counters 51 and 52 to any address contained in memory. This is completely random as the frequency of the oscillator 53 is much greater than a player's response time.

The activation of switch 54 and hence of gate 55 also triggers a one-shot 56 which assures that the display is reset to all zeros to allow a new hand to be displayed, as will be explained.

The random address selected after depression and release of switch 54 is read or decoded by a series of DECODE modules.

Such modules are "and" gates and decode the binary number format stored at the selected address according to the card table and also decode the decision bit as $X_1$ to $X_4$ stored therein.

Hence, a decoder section 56, responds to the dealer's bits $D_1$ to $D_4$. The display drive 57 receives the decoded information and displays the same by activating the LED or some other visual display as 59 indicative of the value of the dealer's open card.

Similarly, the player's bits $P_1$ to $P_8$ are decoded and displayed for the address randomly selected from the ROM 50.

Hence, the player's card values are also displayed at location 60 and 61. It is seen that this format is as that shown in FIG. 1 as 11 and 12.

Since the bits $X_1$ to $X_4$ are stored in straight binary and since only one bit will be positive at one time for one hand, they can be used directly with or without a decoder.

The switches for the operator's decisions are shown as 65, 66, 67 and 68 and are the DRAW (14 of FIG. 1), the STAND (15 of FIG. 1), the SPLIT (17 of FIG. 1) and the DOUBLE or DOUBLE DOWN (16 of FIG. 1). Each switch is coupled to an integrator to prevent switch bounce from affecting the logic or some other gate and so on as 69, 70, 71 and 72.

Each bit lead from the ROM 50 is directed to an input of an "AND" gate. Thus, the bit lead $X_1$ for Draw goes to AND gate 70, while the other input to gate 70 is from the switch 65 via the inverter integrator 69.

Similarly, each other switch as 66 to 68 and the bit lead corresponding thereto goes to a separate AND gate as 71, 72 and 73.

The outputs of gates 70 to 73 are coupled to the inputs of a lamp driver 74 which energizes the RIGHT display lamp 76 (as lamp 19 of FIG. 1).

The WRONG lamp (as 18 of FIG. 1) is activated by a driver 80, whose input is derived from a series of AND gates 81, 82, 83 and 84.

One input of each gate as 81 to 84 is derived from an inverted bit signal via inverters 85, 86, 87 and 88, while the other input to the AND gates 81 to 84 is obtained from the switches 65 to 68 via the inverters 69 to 72. As will be explained, these circuits automatically show a wrong condition if the player makes the wrong decision.

THEORY OF OPERATION

Assume the apparatus shown is in the quiescent state and all decoders and display devices are set to zero.

The EOP signal from ROM 50 will be positive and gate 55 is primed at that input. If switch 54 is depressed, gate 55 causes the oscillator 53 to operate and the mono-stable or one-shot 56 is fired (short pulse width) to assure proper resetting. The oscillator 53 may be an astable multivibrator operating to provide a high frequency pulse train at the output. For example, if oscillator 53 operated at a 1 MHz rate, it would provide 1,000,000 pulses per second. A player could depress switch 54 for as little as 1.5 milliseconds or greater and hence, for 1.5 milliseconds, over 1500 pulses would appear at the output. The X and Y registers 51 and 52 would be stepped this amount and hence a random memory address corresponding to 1500 pulses more or less would be selected.

At this location in memory a sixteen bit number is located and corresponds to any one of a plurality of card hands stored therein. For example, suppose the X and Y selectors accessed a memory position which contained the following bits:

0000 1001 0010 0001

This code determines the following. The dealer's open card is an ACE, the player's cards are a Nine and a Two and the decision bit is a one in the DOUBLE or $X_4$ position (See FIG. 6).

The appropriate dealer and player bits are decoded and displayed as an ACE, Nine and Two. Referring to FIG. 4, it is shown that when a player has a Nine and a Two, he doubles independent of the dealer's card and hence, the $X_4$ bit is a one.

Now assume for this display that the player correctly depresses the DOUBLE (DD) button 68 (16 of FIG. 1). Since the lead $X_4$ is positive, gate 73 will be energized by the positive $X_4$ bit at one input; when switch 68 is closed, gate 73 will be the only one energized, as gates 70, 71 and 72 all have a zero at this input. Since gate 73 energizes, the driver 74 is activated and the lamp 76 indicating a RIGHT decision comes on.

Now assume with the above conditions, the player incorrectly depresses any switch other than the correct switch 68.

For example, assume switch 65 or the DRAW switch is depressed. Since the D ($X_1$) bit is zero, gate 70 will not be activated. But gate 85 has a one at it's output and gate 81 is primed. When switch 65 is closed, gate 81 goes positive, thus driving inverter 80 to light the lamp indicating a WRONG decision.

It will be ascertained that the pressing of any other switch causes the same action to occur.

The player may then press each switch until a correct decision is shown and attempt to review his rules to determine his error. He may also press the next hand button 54 and cause a new display to be presented.

While it is understood that certain details of the logic circuits were left out, it is also understood that one skilled in the art can implement the apparatus in many different ways using mechanical parts as rotating discs for display as well as additional display digits and selection to enable the actual play of both hands.

Other codes and logic could be used as well. It is therefore understood that the above description is for purposes of illustration only and is in no manner intended to be limiting in any way. Furthermore, it is contemplated that the appended claims be interpreted as covering all modifications which fall within the true spirit and scope of this invention.

I claim:

1. Apparatus for teaching the card game of Blackjack or a similar game, wherein it is desired for a player to possess a hand totaling in face card values, as close to a predetermined sum as possible; comprising:
   a. means for generating a first random number indicative of the total of a player's face value cards and a second number indicative of the face value of a dealer's card, and a control signal manifesting a desired one of a number of player actions,
   b. second means for selecting any one of said desired player actions, and
   c. logic means responsive to said second means and said control signal and operative to compare said selected action with said desired one to indicate a proper or improper selection by a player using said apparatus.

2. The apparatus according to claim 1 wherein said means for generating said random numbers includes a read only memory.

3. The apparatus according to claim 1 wherein said player actions include a Draw, Split, Double and Stand as conventionally used in the semantics of blackjack and each is associated with said second means as including separate selector switches.

4. The apparatus according to claim 1, further including means for displaying the sum of said first and second numbers by first and second separate displays.

5. A method for teaching the game of Blackjack comprising the steps of:
   a. storing in a memory a plurality of numbers indicative of two player's cards and one dealer card,
   b. placing in said memory a digit in a predetermined position and determined according to the value of said player's cards with said dealer's cards,
   c. displaying said numbers on a separate display for said player's cards and said dealer's cards,
   d. depressing one of a given number of select switches determinative of one of a plurality of player actions available in said game of blackjack, and
   e. indicating whether said selected action was correct in view of said digit.

6. A teaching apparatus for learning the game of blackjack, comprising:
   a. a memory having a plurality of addresses for storing at each address one of a plurality of blackjack hands, including at least two player cards and one dealer card, said address further including indicia stored therein determinative of a proper player response,
   b. means for displaying said Blackjack hand as stored,
   c. selection means for selecting any one of a given number of player responses, and
   d. logic means responsive to said one selected response and said indicia to provide an indication of a correct player decision.

7. The apparatus according to claim 6 wherein said memory is a read only memory having a plurality of address locations for storing therein any combination determined by a deck of fifty-two playing cards and indicative of two player cards and one dealer's card.

8. The apparatus according to claim 6 wherein said memory is of the type which is accessed by an X and Y registers.

9. The apparatus according to claim 8 wherein said registers are randomly accessed.

10. The apparatus according to claim 6 wherein said logic means include a RIGHT display indicator and a WRONG display indicator, said wrong display indicator being activated whenever an improper player response is selected by said selection means.

* * * * *